United States Patent
Burkard et al.

(10) Patent No.: US 7,882,231 B2
(45) Date of Patent: Feb. 1, 2011

(54) TECHNIQUE FOR REGULATING LINK TRAFFIC

(75) Inventors: Timo Burkard, Mountain View, CA (US); David Presotto, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 446 days.

(21) Appl. No.: 12/114,350

(22) Filed: May 2, 2008

(65) Prior Publication Data

US 2009/0276518 A1  Nov. 5, 2009

(51) Int. Cl.
    *G06F 13/00* (2006.01)
(52) U.S. Cl. .................. 709/226; 709/224; 709/229
(58) Field of Classification Search ........... 709/223, 709/224, 225, 226, 227, 228, 229
    See application file for complete search history.

(56) References Cited

U.S. PATENT DOCUMENTS

| | | | |
|---|---|---|---|
| 6,307,867 B1 * | 10/2001 | Roobol et al. | 370/470 |
| 6,882,660 B2 * | 4/2005 | Lee et al. | 370/469 |
| 6,889,041 B2 * | 5/2005 | Miyoshi et al. | 455/423 |
| 2003/0074674 A1 | 4/2003 | Magliaro | |
| 2003/0081672 A1 | 5/2003 | Li | |
| 2004/0165575 A1 | 8/2004 | Yang | |
| 2004/0240384 A1 | 12/2004 | Hari | |

* cited by examiner

*Primary Examiner*—Viet Vu
(74) *Attorney, Agent, or Firm*—Park, Vaughn, Fleming & Dowler LLP; Steven E. Stupp (57) ABSTRACT

A system which regulates communication with a server is described. During operation, the system determines a retransmission rate of data packets during a first set of conversations between a group of users and the server via a peering link. Next, the system compares the retransmission rate and an historical retransmission rate of data packets during a second set of conversations between a second group of users and the server via the peering link. The system then adjusts a target acceptance rate of the server to requests to initiate conversations with additional users via the peering link based on the comparison of the retransmission rate and the historical retransmission rate. Additionally, the system accepts or rejects a request to initiate a conversation between another user and the server via the peering link based on an actual acceptance rate of the server to requests to initiate the conversations and the target acceptance rate.

24 Claims, 5 Drawing Sheets

┌─────────────────────────────────────────────────────────────┐
│ DETERMINE A RETRANSMISSION RATE OF DATA PACKETS DURING A FIRST SET │
│ OF CONVERSATIONS BETWEEN A GROUP OF USERS AND A SERVER VIA A │
│ PEERING LINK IN A NETWORK, WHERE A GIVEN CONVERSATION IN THE FIRST │
│ SET OF CONVERSATIONS WAS INITIATED WITHIN A FIRST TIME INTERVAL │
│ 210 │
└─────────────────────────────────────────────────────────────┘
                                │
                                ▼
┌─────────────────────────────────────────────────────────────┐
│ COMPARE THE RETRANSMISSION RATE AND AN HISTORICAL │
│ RETRANSMISSION RATE OF DATA PACKETS DURING A SECOND SET OF │
│ CONVERSATIONS BETWEEN A SECOND GROUP OF USERS AND THE SERVER VIA │
│ THE PEERING LINK, WHERE A GIVEN CONVERSATION IN THE SECOND SET OF │
│ CONVERSATIONS OCCURRED WITHIN A SECOND TIME INTERVAL, AND WHERE │
│ THE SECOND SET OF CONVERSATIONS INCLUDES THE FIRST SET OF │
│ CONVERSATIONS, THE SECOND GROUP OF USERS INCLUDES THE FIRST GROUP │
│ OF USERS, AND THE SECOND TIME INTERVAL INCLUDES THE FIRST TIME │
│ INTERVAL │
│ 212 │
└─────────────────────────────────────────────────────────────┘
                                │
                                ▼
┌─────────────────────────────────────────────────────────────┐
│ ADJUST A TARGET ACCEPTANCE RATE OF THE SERVER TO REQUESTS TO │
│ INITIATE CONVERSATIONS WITH ADDITIONAL USERS VIA THE PEERING LINK │
│ BASED ON THE COMPARISON OF THE RETRANSMISSION RATE AND THE │
│ HISTORICAL RETRANSMISSION RATE │
│ 214 │
└─────────────────────────────────────────────────────────────┘
                                │
                                ▼
┌─────────────────────────────────────────────────────────────┐
│ ACCEPT OR REJECT A REQUEST TO INITIATE A CONVERSATION BETWEEN │
│ ANOTHER USER AND THE SERVER VIA THE PEERING LINK BASED ON AN │
│ ACTUAL ACCEPTANCE RATE OF THE SERVER TO REQUESTS TO INITIATE THE │
│ CONVERSATIONS WITH THE ADDITIONAL USERS VIA THE PEERING LINK AND │
│ THE TARGET ACCEPTANCE RATE, THEREBY MAINTAINING COMMUNICATION │
│ PERFORMANCE OF THE PEERING LINK │
│ 216 │
└─────────────────────────────────────────────────────────────┘

TECHNIQUE FOR REGULATING LINK TRAFFIC

BACKGROUND

1. Field

The present embodiments relate to techniques for regulating communication. More specifically, the present embodiments relate to techniques for accepting or rejecting requests to initiate conversations on a link in a network.

2. Related Art

A server in a network, such as the Internet or World Wide Web (WWW), may communicate data with users through a network that is multi-homed, e.g., that is connected using multiple links. In general, financial arrangements between an operator of the server and the providers who operate the links can be grouped into two categories: (1) paid-transit arrangements in which one or more providers are paid to transport data and/or (2) peering agreements in which the server operator and one or more additional providers typically agree to transport data to each other without payment. While paid-transit arrangements typically permit traffic to or from all users in the network to be communicated via so-called 'transit' links, so-called 'peering' links associated with peering agreements generally only cover traffic sent to or from those users residing on a sub-network that is operated by the respective peering partner (such as one of the additional providers) of the server operator.

In the network, routes for data packets directed to or from the server are typically determined using a Border Gateway Protocol (BGP). For example, providers of transit links may use BGP to specify a destination associated with one or more router information blocks (RIBs). In contrast, the additional peering providers typically only indicate the RIBs of users that reside on their portion sub-network because they do not want to relay traffic associated with other users in the network.

Unfortunately, it can be difficult to regulate the amount of traffic on transit links and/or peering links, which can result in a given link exceeding its capacity. The resulting overflow condition often results in degraded performance, such as re-buffering of video during video streaming. This problem can be more severe for peering links because they tend to be under provisioned compared to transit links.

SUMMARY

One embodiment provides a system for regulating communication with a server. During operation, the system determines a retransmission rate of data packets during a first set of conversations between a group of users and the server via a peering link in a network, where the first set of conversations were initiated within a first time interval. Then, the system compares the retransmission rate and an historical retransmission rate of data packets during a second set of conversations between a second group of users and the server via the peering link, where the second set of conversations occurred within a second time interval. In some embodiments, the second set of conversations includes the first set of conversations, the second group of users includes the first group of users, and the second time interval includes the first time interval.

Next, the system adjusts a target acceptance rate of the server for requests to initiate conversations with additional users via the peering link, where the target acceptance rate is based on the comparison of the retransmission rate and the historical retransmission rate. Moreover, the system accepts or rejects a request to initiate a conversation between another user and the server via the peering link based on a comparison between an actual acceptance rate of the server and the target acceptance rate, thereby maintaining communication performance of the peering link.

In some embodiments, the network includes the Internet.

In some embodiments, the first time interval includes one minute and/or the second time interval includes one day.

In some embodiments, the historical retransmission rate includes a moment of a distribution of the retransmission rate during the second time interval. For example, the moment may include the median.

In some embodiments, the network includes at least one transit link coupled to another server, and the at least one transit link may couple the server to an Internet Service Provider (ISP). For example, the ISP may bill an operator of the server to transport data packets. Moreover, rejection of the request may include instructions redirecting the other user to the other server, such as a transit backup server that traffic to which traffic is redirected.

In some embodiments, the system accepts or rejects the request based on a difference between the actual acceptance rate and the target acceptance rate.

In some embodiments, a peering link includes a settlement-free link between an operator of the server and another entity on the network. For example, the entity and the operator may agree to transport data packets for each other without payment.

In some embodiments, the system collects statistical information about the second set of conversations, where the retransmission rate is determined, at least in part, based on the collected statistical information.

In some embodiments, the system determines which conversations are likely to be associated with the peering link based on Border Gateway Protocol (BGP) information.

In some embodiments, the target acceptance rate of the server, which can be adjusted over time, is greater than a minimum value and less than a maximum value, which may be fixed. Moreover, the target acceptance rate of the server may be less than twice the actual acceptance rate of the server.

In some embodiments, the target acceptance rate is adjusted based on a van Jacobsen control model.

In some embodiments, the target acceptance rate is adjusted based on a difference between the retransmission rate and the historical retransmission rate. Moreover, the target acceptance rate may be adjusted when the retransmission rate exceeds the historical retransmission rate by a pre-determined value. Note that the adjustment may include reducing the target acceptance rate by a multiplicative factor.

Additionally, the system may increase the target acceptance rate when a conversation terminates. For example, the target acceptance rate may be increased by an additive increment when a conversation terminates, where the additive increment is selected so that an associated rate of increase in the target acceptance rate is less than a rate of decrease in the target acceptance rate associated with the multiplicative factor.

In some embodiments, the system is implemented by a computer system, which may include the server or which may be included in the server.

Another embodiment provides a method that includes at least some of the above-described operations that are performed by the system.

Another embodiment provides a computer-program product for use in conjunction with the system. This computer-program product may include instructions corresponding to at least some of the above-described operations that are performed by the system.

Another embodiment provides a server. This server may include an input node configured to couple to a network that includes a peering link, which is configured to communicate data packets between users and the server. Moreover, the server may include a peering manager that is configured to: determine the retransmission rate, compare the retransmission rate and the historical retransmission rate, adjust the target acceptance rate, and accept or reject the request.

BRIEF DESCRIPTION OF THE FIGURES

Note that like reference numerals refer to corresponding parts throughout the drawings.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present disclosure is not intended to be limited to the embodiments shown, but is to be accorded the widest scope consistent with the principles and features disclosed herein.

Embodiments of a system (which may be a computer system), a server, a method, and a computer-program product (e.g., software) for use with the system and/or the server are described. These devices and techniques may be used to regulate communication with the server. In particular, a target acceptance rate of the server (such as a target for a number of bytes per second to admit) to requests to initiate conversations with additional or new users via a link in a network (such as the Internet) may be adjusted based on a comparison of a retransmission rate of data packets and an historical retransmission rate of data packets. For example, the target acceptance rate may be adjusted based on a difference between the retransmission rate and the historical retransmission rate. In the discussion that follows a peering link is used an illustrative example of a link. Note that the peering link for a given user may be identified based on BGP information.

Moreover, requests to initiate a conversation with another user and the server via the peering link may be accepted or rejected based on an actual acceptance rate of the server (such as an actual number of bytes admitted per second) to requests to initiate the conversations with the additional users via the peering link and the target acceptance rate. For example, the requests may be accepted or rejected based on a difference between the actual acceptance rate and the target acceptance rate. In this way, communication performance of the peering link may be maintained and/or the utilization of the peering link may be maximized.

Note that the retransmission rate may be based on conversations between users and the server via the peering link that were initiated within a first time interval (such as one minute), and that the historical retransmission rate may be based on conversations between users and the server via the peering link that occurred within a second time interval (such as one day).

In the discussion that follows, a peering link may include a link between an operator of the server and another entity on the network. For example, the entity and the operator may agree to transport data packets for each other without payment or on a settlement-free basis (e.g., based on a peering agreement). While in some embodiments there may be a settlement involved for data transported on a peering link, in general a peering link is a link between two entities on the network that agree to transport data packets to each others users without charging a fee. Note that the other entity may be an ISP.

Moreover, a transit link may include a link between the server and an ISP, where the ISP charges the operator of the server to transport data to and from the server. A more general definition of a transit link is a link between two entities on the network were at least one of the entities charges the other to transport data packets.

In some embodiments, the operator of the server is an ISP or an application provider.

Note that the network may include: the Internet or World Wide Web (WWW), an intranet, a local area network (LAN) (such as IEEE 802.11 or WiFi), a wide area network (WAN) (such as IEEE 802.16 or WIMAX), a metropolitan area network (MAN), a satellite network, a wireless network (such as a cellular telephone network), an optical network, and/or a combination of networks or other technology enabling communication between computing systems or electronic devices.

Figure 1:
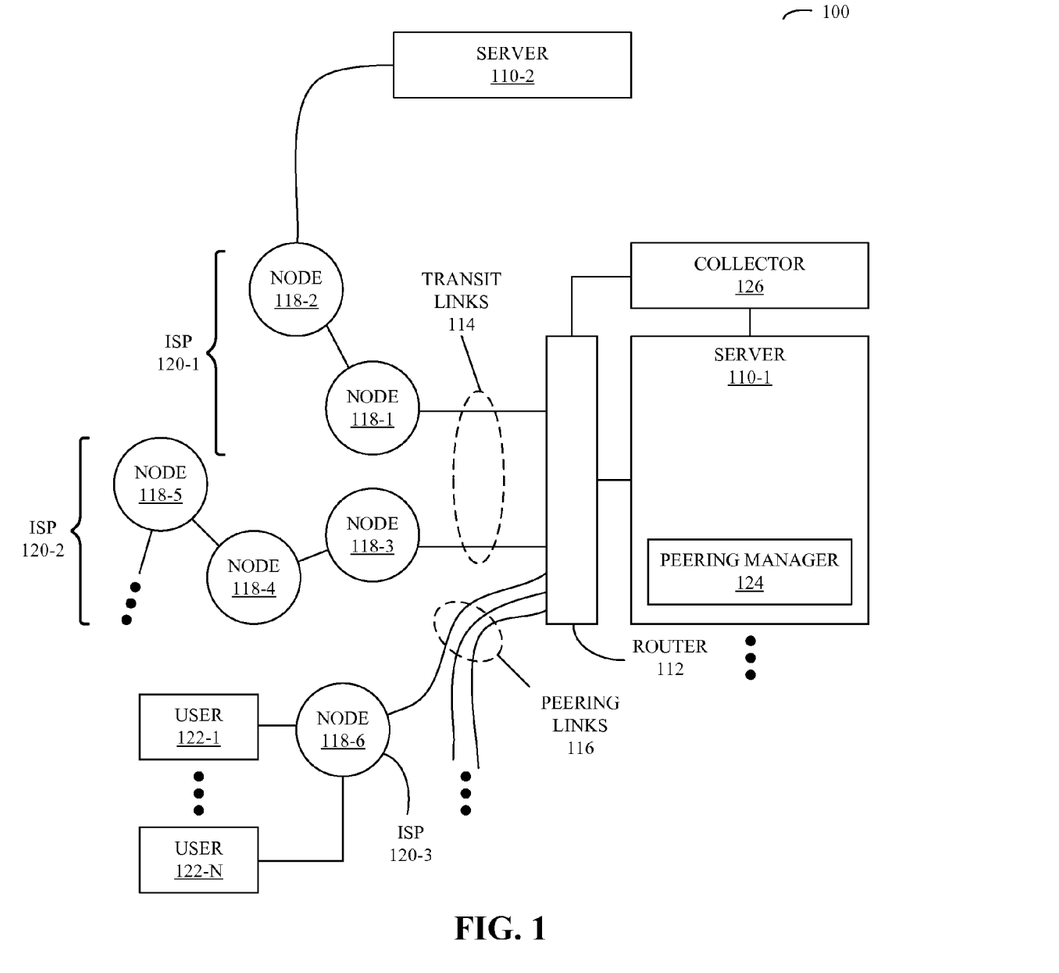
FIG. 1 is a block diagram illustrating an embodiment of a communication system.

We now describe embodiments of a communication system that includes the network. FIG. 1 presents a block diagram illustrating a communication system 100. In this system, a server 110-1 provides data (for example, a video data stream) to users, such as users 122, via a router 112 and a network, such as the Internet. These so-called 'connections' or 'conversations' between the users and the server 110-1 may be via links, which can include transit links 114 and/or peering links 116. As noted previously, the peering link associated with a given user may be identified based on BGP information.

Note that transit links 114 may be associated with ISPs 120-1 and/or 120-2, while peering links 116 may be associated with ISP 120-3 (and more generally, with an entity on the network). Moreover, ISPs 120-1 and 120-2 may have a different status or tiers in the network than ISP 120-3 or the operator of the server 110-1 (who may or may not be associated with one of the ISPs 120). For example, ISPs 120-1 and 120-2 may be tier 1 providers, while ISP 120-3 may be a tier 2 or 3 provider. However, ISPs 120 may or may not be different tier providers. Furthermore, as noted previously, ISPs 120-1 and 120-2 may be paid by the operator of server 110-1 to transport the data, while ISP 120-3 may have a peering agreement with the operator of the server 110-1, i.e., ISP 120-3 may transport data to or from users 122 that are in the sub-network operated by ISP 120-3 without charging the operator of server 110-1 (i.e., settlement-free transport).

Unfortunately, when the server 110-1 is providing the data to the users 122, one or more of the peering links 116 may reach its maximum capacity, even though other peering links in the peering links 116 may still have ample capacity available for additional conversations. This can result in dropped data packets on the affected peering links. Additionally, such performance degradation may occur due to resource limitations in server 110-1.

To address these performance challenges, one or more servers in communication system 100, such as server 110-1, may include a peering manager 124. This peering manager may determine whether or not to accept a request to initiate a conversation with a new user via a given peering link and/or whether or not to accept additional data associated with an existing conversation with one or more of the users 122 via the given peering link. For example, the decision of the peering manager 124 may be, at least in part, based a performance metric associated with the given peering link, such as observed transmission control protocol (TCP) loss rates during one or more time intervals. If a request is rejected, the peering manager 124 may provide instructions that redirect the one or more users to one or more additional servers in the network, such as server 110-2.

Figure 2:
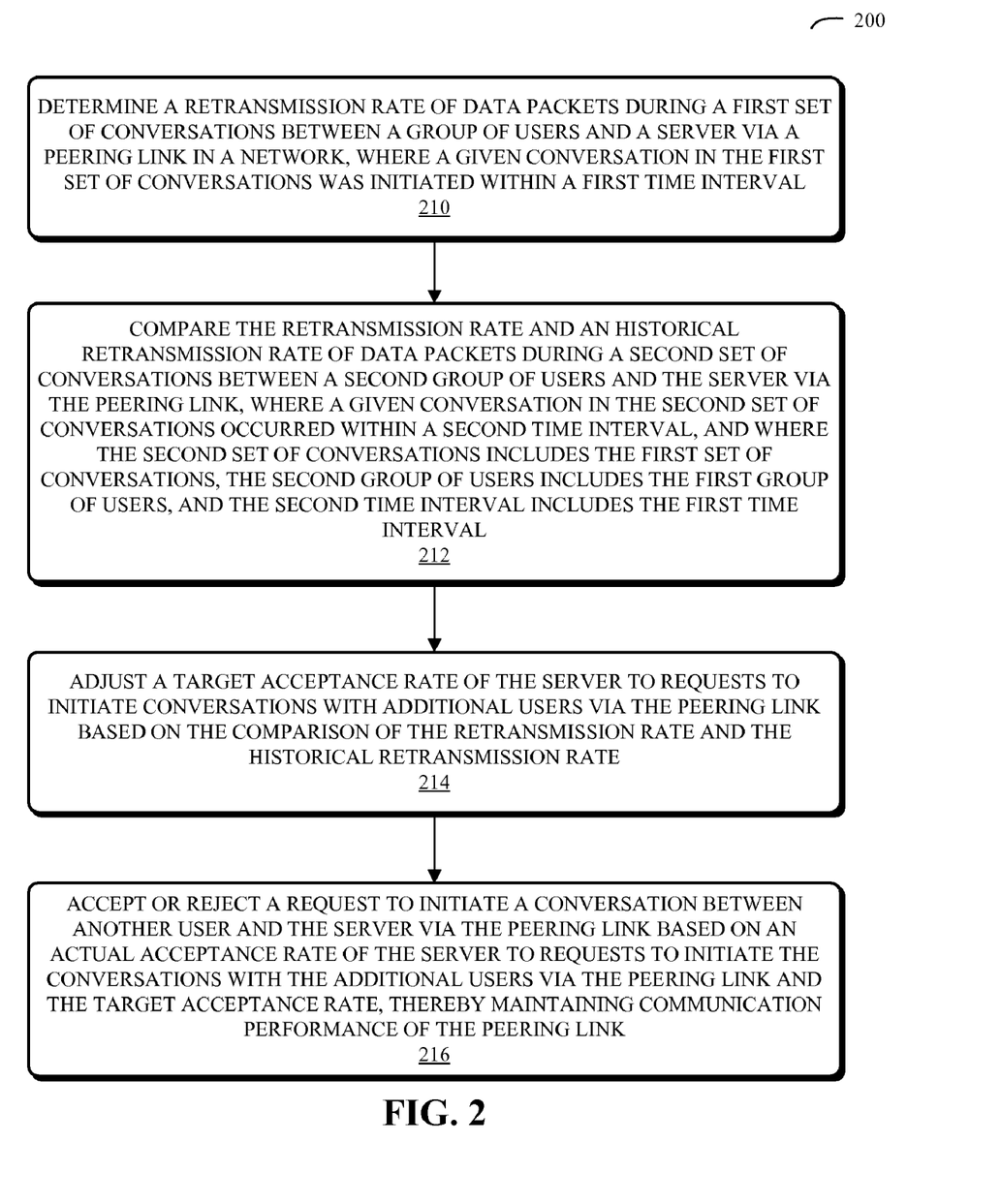
FIG. 2 is a flowchart illustrating an embodiment of a process for regulating communication with a server.

As described further below with reference to FIGS. 2 and 3, during operation peering manager 124 may determine a retransmission rate of data packets transported via the given peering link during conversations that were recently initiated (such as during the last minute) and an historical retransmission rate of data packets transported via the given peering link during conversations that occurred during a longer time interval (such as during the preceding day). Based on a comparison of these retransmission rates, peering manager 124 may adjust a target acceptance rate of accepting or rejecting requests to initiate new conversation via the given peering link and/or requests to receive additional data associated with an existing conversation via the given peering link. Moreover, the peering manager 124 may accept or reject such requests based on the target acceptance rate and an actual acceptance rate.

Note that peering manager 124 may, at least in part, determine these retransmission rates using statistical information that is collected by collector 126. In particular, collector 126 may aggregate information about conversations, links and the associated retransmission rates, such as the TCP loss rates, during one or more time intervals.

Moreover, note that communication in the network may occur via multiple hops between nodes 118. ISPs 120-1 and 120-2 may provide information about the relative location of a given node in their sub-network to a particular user in order to determine appropriate routing and/or billing. In some embodiments, this information includes: BGP information, RIB information, and/or CIDR (classless inter-domain routing) blocks, which include lists of IP ranges that are associated with particular links. Similarly, ISP 120-3 may provide information, such as the BGP information, for users 122 in its sub-network in order to prevent abuse of the peering agreement with the operator of the server 110-1.

In some embodiments, peering manager 124 may use the information, such as the BGP information, to determine which users are associated with the given peering link. In some embodiments, router 112 may receive the information, and this information may be aggregated by collector 126 for subsequent use by the peering manager 124.

By regulating communication with the server 110-1, this technique may facilitate high-utilization communication via one or more peering links 116 without oscillation and with reduced or eliminated performance degradation, such as re-buffering of a video stream. Moreover, this technique may facilitate such communication without over-provisioning the peering links 116, e.g., excess capacity on one or more of the peering links 116 can be used without an overflow condition occurring.

Communication system 100 may include fewer components or additional components. For example, there may be sixteen servers 110, each of which may have an associated peering manager. (Note that even though these peering managers may operate independently of each other, they may use essentially the same feedback information associated with common buffers that spill over at the same time. Consequently, if one or more of the peering managers is aggressive, the other peering managers may be sufficiently less aggressive that the overall capacity of the peering links 116 may be maintained.) Moreover, two or more components may be combined into a single component, and/or a position of one or more components may be changed. For example, the peering manager 124 may regulate communication associated with multiple servers 110.

We now describe embodiments of a method for regulating communication with a server. FIG. 2 presents a flowchart illustrating a process 200 for regulating communication with a server (such as server 110-1 in FIG. 1), which may be performed by a system that includes the server or that is included in the server. During operation, the system determines a retransmission rate of data packets during a first set of conversations between a group of users and the server via a peering link in a network, where a given conversation in the first set of conversations was initiated within a first time interval (210). Then, the system compares the retransmission rate and an historical retransmission rate of data packets during a second set of conversations between a second group of users and the server via the peering link, where a given conversation in the second set of conversations occurred within a second time interval (212). Note that the second set of conversations includes the first set of conversations, the second group of users includes the first group of users, and the second time interval includes the first time interval.

Next, the system adjusts a target acceptance rate of the server to requests to initiate conversations with additional users via the peering link based on the comparison of the retransmission rate and the historical retransmission rate (214). Moreover, the system accepts or rejects a request to initiate a conversation between another user and the server via the peering link based on an actual acceptance rate of the server to requests to initiate the conversations with the additional users via the peering link and the target acceptance rate (216), thereby maintaining communication performance of the peering link.

Figure 3:
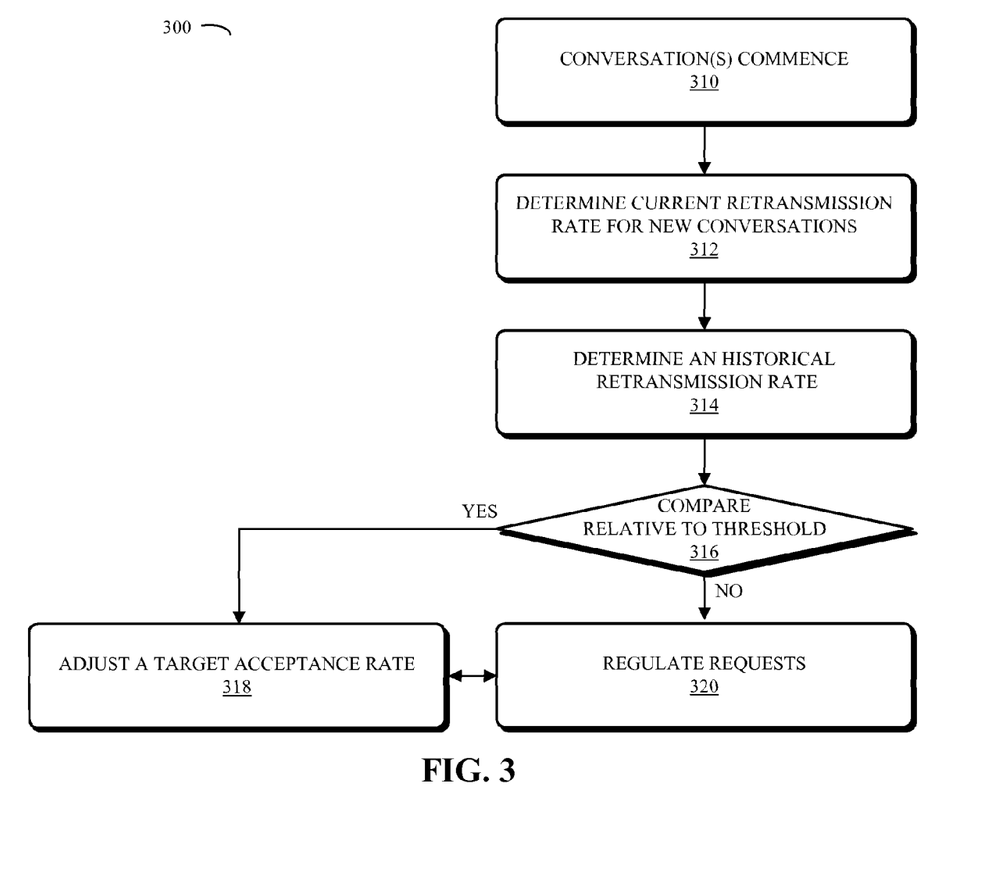
FIG. 3 is a flowchart illustrating an embodiment of a process for regulating communication with a server.

FIG. 3 presents a flowchart illustrating a process 300 for regulating communication with a server (such as server 110-1 in FIG. 1), which may be performed by a system that includes the server or that is included in the server. During operation, a conversation with the server may commence (310). For example, a user may connect to the server via the given peering link. Which link this user is using may be determined using up-to-date BGP information from an external system, such as collector 126 (FIG. 1), which may collect this information based on route reflection of routers in the network. In particular, this information may provide router interfaces and RIBs for each link in the network, and incoming data associated with a given user may be attributed to a given link by matching its IP address to one of the provided RIBs.

Then, the system may determine current retransmission rate for new conversations (312) via a given peering link (such as conversations that were initiated during the last minute) and an historical retransmission rate (314) via the given peering link (such as conversations that occurred during the preceding day or days) based on collected statistical information. In order to prevent biasing the regulation based on the loss rates associated with users that have slow connections, the current retransmission rate may be determined based on new users, such as those that initiated conversations during the last minute. Furthermore, by using the historical retransmission rate as a baseline, the target acceptance rate may be adjusted (as described further below) relative to the 'normal' loss rate on the given link (which may vary from link to link).

Note that these retransmission rates may be based on TCP loss rates during the one or more time intervals, which provide metrics of the performance degradation associated with network capacity. In particular, using a so-called 'getsocketopt' system call in Linux, the number of retransmitted TCP data packets on each socket may be determined. Multiplying this value by the maximum segment size for this socket, and dividing it by the number of bytes sent may provide an approximation for the data-packet loss ratio.

Additionally, in some embodiments the historical retransmission rate includes a moment of a distribution of the retransmission rate. For example, the moment may include the median of the retransmission rate, which is determined every minute over a 24-hour time interval. This approach may reduce or eliminate the impact of statistical outliers.

Next, the system may compare the current retransmission rate with the historical retransmission rate relative to a threshold (316). For example, the system may compute the difference of the current retransmission rate and the historical retransmission rate. In an exemplary embodiment, if the current retransmission rate exceeds the historical retransmission rate by more than 3%, the target acceptance rate associated with the given peering link may be adjusted (318) (and, in particular, reduced). This threshold may provide a margin that helps maintain performance during communication via the given peering link.

In an exemplary embodiment, the system adjusts the target acceptance rate associated with the given peering link using a Jacobsen control model. In particular, the target acceptance rate associated with the given peering link may be increased using a multiplicative factor and decreased using another multiplicative factor. In other embodiments, the target acceptance rate associated with the given peering link may be increased using an additive increment and/or the target acceptance rate associated with the given peering link may be decreased using another additive increment. However, note that the use of the multiplicative factors may facilitate adjustment of target acceptance rates for peering links that have very different capacities, thereby avoiding overshooting or a slow response.

As noted previously, the comparison of the retransmission rates during different time intervals may pose a constraint or an upper bound on increases in the target acceptance rate. Moreover, the target acceptance rate associated with the given peering link may be greater than a minimum value and less than a maximum value (irrespective of the retransmission rates). Additionally, the target acceptance rate associated with the given peering link may be less than twice the actual acceptance rate associated with the given peering link.

Adjustments to the target acceptance rate associated with the given peering link (in particular, decrements to the target acceptance rate) may be determined every minute (however, as discussed below, increments to the target acceptance rate may occur whenever a conversation terminates). When the difference between the current retransmission rate and the historical retransmission rate is less than the threshold, the target acceptance rate may be increased by the multiplicative factor, which is ten-times smaller than the other multiplicative factor. Moreover, when a conversation terminates, the actual acceptance rate associated with the given peering link decreases, and the target acceptance rate associated with the given peering link may be increased so that, after a time interval approximately equal to that of a typical video (such as one minute), the increase may equal 10% (effectively, 1.1 new videos may be targeted for acceptance instead of 1 new video). This increase may be based on an additive increment, which may be selected so that a rate of increase in the target acceptance rate is less than a rate of decrease in the target acceptance rate associated with the multiplicative factor. For example, the rate of increase as a function of time may be ten-times smaller than the rate of decrease as a function of time, so that it may take ten-times longer for the additive increments to cancel the effect of the multiplicative factor.

In contrast, when the difference between the current retransmission rate and the historical retransmission rate is greater than the threshold, the target acceptance rate may be decreased by the other multiplicative factor. This decrease may be implemented at one-minute intervals. In some embodiments, the decreased target acceptance rate equals one-half times the old target acceptance rate.

If the comparison is less than the threshold (316), or after the target acceptance rate has been adjusted (318), the system may regulate requests (320), such as requests for a new conversation between a new user and the server or requests to communicate additional data during an existing conversation between another user and the server. In particular, the server may accept or reject every request for a conversation (new or existing) via the given peering link based on the target acceptance rate associated with the given peering link and the actual acceptance rate associated with the given peering link. For example, when the actual acceptance rate exceeds the target acceptance rate, the request may be rejected, and when the actual acceptance rate is less than the target acceptance rate, the request may be accepted. Note that when a request is rejected, the user may be instructed (for example, using a hypertext transfer protocol or HTTP redirect) to go to another server.

In some embodiments, the target acceptance rate indicates a target for a number of bytes to admit per second via the given peering link, and the actual acceptance rate indicates the actual number of bytes admitted per second via the given peering link. However, in some embodiments the actual acceptance rate associated with a new conversation is the current number of admitted bits per second plus the expected number of bits per second associated with the new conversation. Similarly, when a conversation terminates, the actual acceptance rate may be decreased by the expected number of bits per second associated with this conversation.

In other embodiments, the regulation technique may use different parameters. For example, the time intervals used to determine the retransmission rates may be different, or a different amount of margin (e.g., a different threshold) may be used when comparing the current retransmission rate and the historical retransmission rate. Moreover, one or more moments of the retransmission distribution other than the median may be used (such as the average).

Furthermore, instead of using the TCP data-packet loss, in other embodiments other metrics that are indicative of network capacity may be used, including: dropped data packets at a router (such as router 112 in FIG. 1), a percentage of the probe traffic that is dropped, or the amount of headroom (where headroom is the ratio of bytes delivered versus the bytes needed to play back without re-buffering). For example, if the headroom for all users on the given peering link falls below 1.0 re-buffering may occur, while for larger values of the headroom there is typically no need for re-buffering.

Additionally, while the preceding discussion has ignored the cost of reading a request and/or issuing redirect instructions (which may be appropriate for very large downloads, such as downloads greater than 1 MB), in other embodiments the regulation technique may include the cost associated with these operations.

In some embodiments of process 200 (FIG. 2) and 300 there are additional or fewer operations. Moreover, the order of the operations may be changed, and two or more operations may be combined into a single operation.

Figure 4:
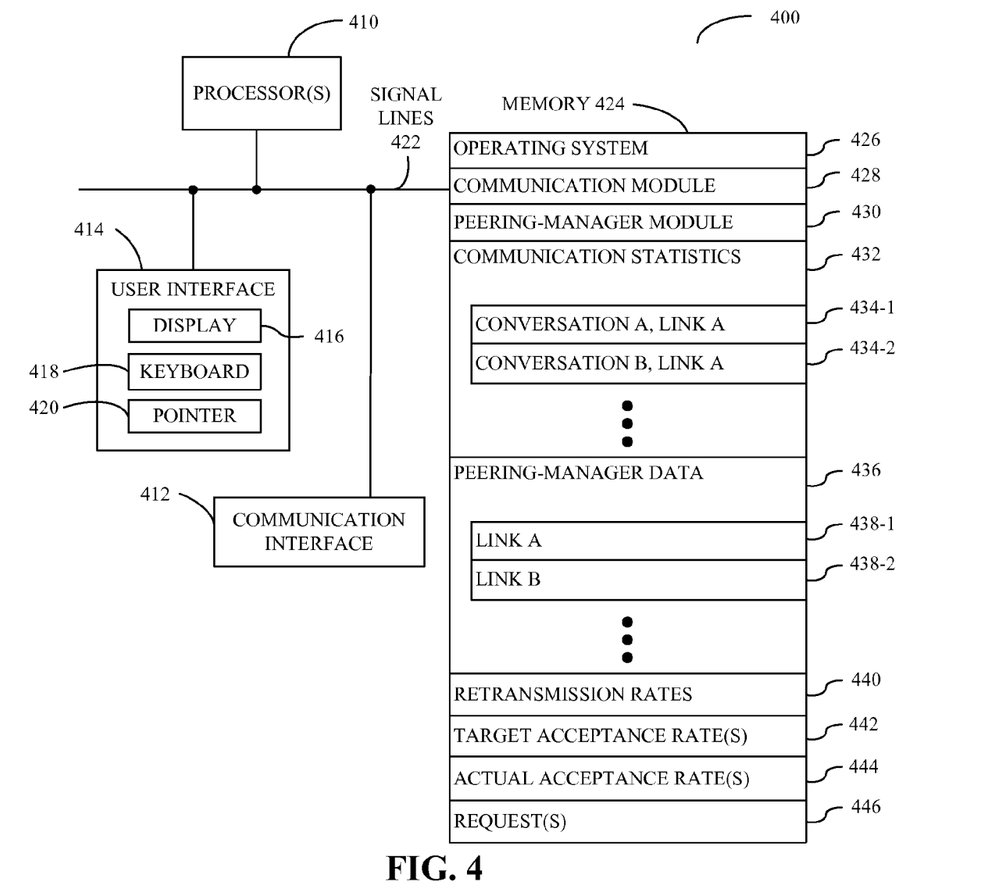
FIG. 4 is a block diagram illustrating an embodiment of a system.

We now describe embodiments of a system that may implement at least a portion of the method for regulating communication with a server (such as server 110-1 in FIG. 1). FIG. 4 presents a block diagram illustrating an embodiment of a system 400. System 400 includes: one or more processors 410, a communication interface 412, a user interface 414, and one or more signal lines 422 coupling these components together. Note that the one or more processing units 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in the system 400 may include volatile memory and/or non-volatile memory. More specifically, memory 424 may include: ROM, RAM, EPROM, EEPROM, Flash, one or more smart cards, one or more magnetic disc storage devices, and/or one or more optical storage devices. Memory 424 may store an operating system 426 that includes procedures (or a set of instructions) for handling various basic system services for performing hardware-dependent tasks. While not shown in FIG. 4, the operating system 426 may include a browser (or set of instructions) for providing and/or rendering information in web pages. Memory 424 may also store communications procedures (or a set of instructions) in a communication module 428. These communication procedures may be used for communicating with: one or more computers, devices and/or servers, including computers, devices and/or servers that are remotely located with respect to the system 400.

Memory 424 may also include one or more program modules (or a set of instructions), including peering-manager module 430 (or a set of instructions). Peering-manager module 430 may analyze communication statistics 432, such as those associated with conversations between users and a server via one or more links in a network (for example, conversation A on link A 434-1 and/or conversation B on link A 434-2), to determine retransmission rates 440 during different time intervals. For example, the retransmission rate for conversations associated with a given link that were initiated in the last minute may be determined. Similarly, an historical retransmission rate for conversations associated with the given link in the last day may be determined. Note that information about conversations and when they were initiated (and whether or not they are ongoing) may be included in peering-manager data 436, which includes such information for multiple links (including link A 438-1 and/or link B 438-2).

Based on the retransmission rates 440, peering-manager module 430 may determine one or more target acceptance rates 442 for one or more links. For example, the target acceptance rates 442 may be adjusted based on a van Jacobsen control model. Moreover, based on the target acceptance rates 442 and actual acceptance rates 444 for these links (which may be determined using the communication statistics 432), peering-manager module 430 may accept or reject requests 446 to initiate another conversation with another user on the given link.

In some embodiments, peering-manager module 430 may recommend another server when requests 446 are rejected. Additionally, in some embodiments peering-manager module 430 may increase one or more target acceptance rates 442 for one or more links when one or more conversations terminate.

Instructions in the various modules in the memory 424 may be implemented in: a high-level procedural language, an object-oriented programming language, and/or in an assembly or machine language. The programming language may be compiled or interpreted, i.e., configurable or configured to be executed by the one or more processing units 410.

Although the system 400 is illustrated as having a number of discrete components, FIG. 4 is intended to be a functional description of the various features that may be present in the system 400 rather than as a structural schematic of the embodiments described herein. In practice, and as recognized by those of ordinary skill in the art, the functions of the system 400 may be distributed over a large number of servers or computers, with various groups of the servers or computers performing particular subsets of the functions.

In some embodiments, some or all of the functionality of the system 400 may be implemented in one or more application specific integrated circuits (ASICs) and/or one or more digital signal processors (DSPs).

System 400 may include fewer components or additional components. Moreover, two or more components may be combined into a single component, and/or a position of one or more components may be changed. In some embodiments, the functionality of system 400 may be implemented more in hardware and less in software, or less in hardware and more in software, as is known in the art.

Figure 5:
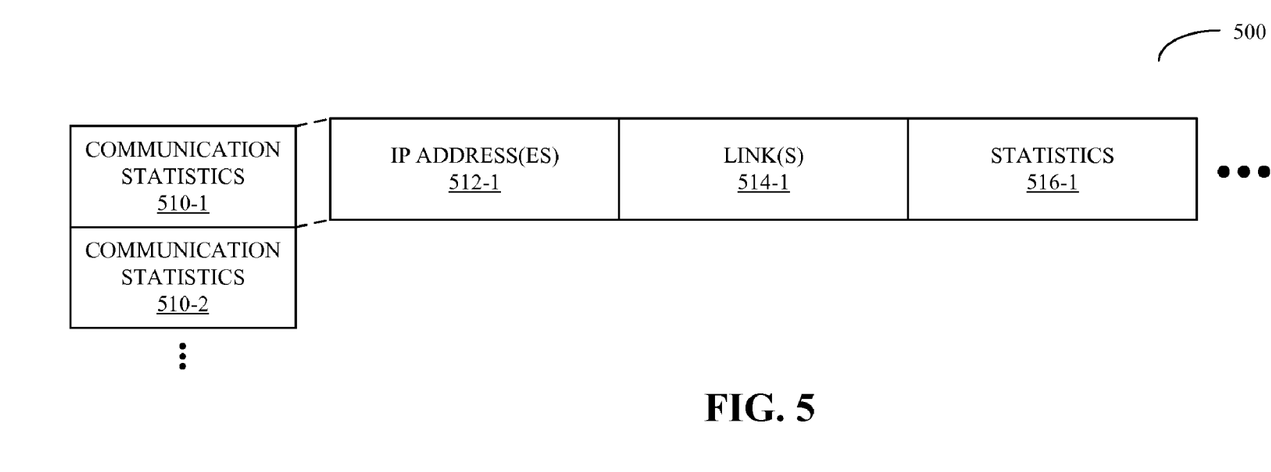
FIG. 5 is a block diagram illustrating an embodiment of a data structure.

We now describe embodiments of data structures that may be used in system 400. FIG. 5 presents a block diagram illustrating an embodiment of a data structure 500. This data structure may include communication statistics 510. For example, communication statistics 510-1 may include: one or more IP addresses 512-1, one or more links 514-1, and/or statistics 516-1 (such as TCP loss rates).

Figure 6:
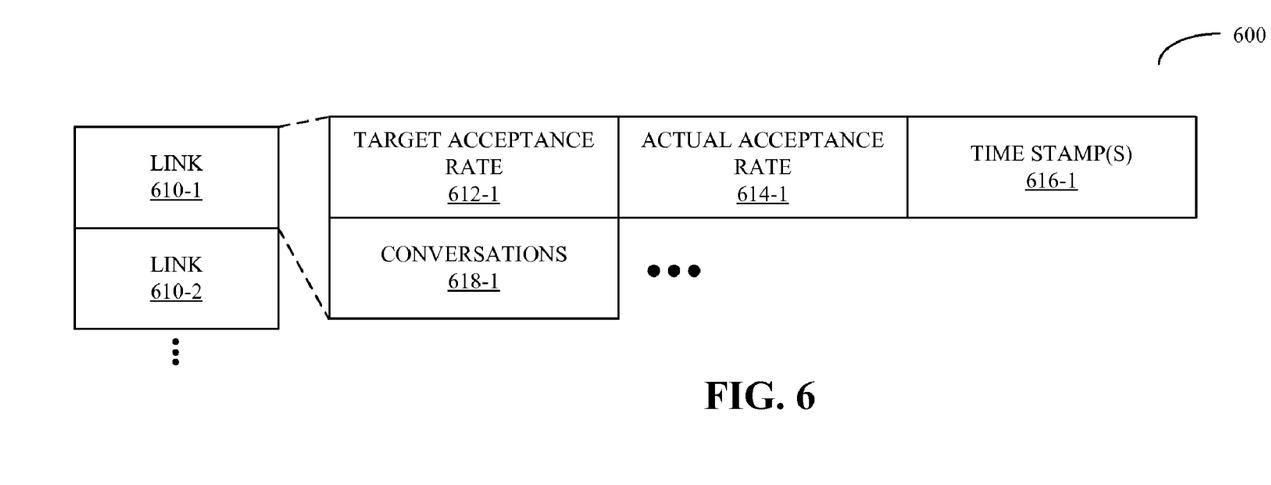
FIG. 6 is a block diagram illustrating an embodiment of a data structure.

FIG. 6 presents a block diagram illustrating an embodiment of a data structure 600. This data structure may include information about links 610. For example, the information about link 610-1 may include: a target acceptance rate 612-1, an actual acceptance rate 614-1, and/or one or more time stamps 616-1 that indicate when corresponding conversations 618-1 were initiated or terminated.

In some embodiments, data structures 500 (FIG. 5) and 600 include fewer or additional components. Moreover, two or more components may be combined into a single component, and/or a position of one or more components may be changed.

While the preceding embodiments have used the regulation of communication via a peering link as an illustrative example, in other embodiments the aforementioned techniques may be used to regulate communication via other types of links, such as one or more transit links.

The foregoing descriptions of embodiments have been presented for purposes of illustration and description only. They are not intended to be exhaustive or to limit the present embodiments to the forms disclosed. Accordingly, many modifications and variations will be apparent to practitioners skilled in the art. Additionally, the above disclosure is not intended to limit the present embodiments. The scope of the present embodiments is defined by the appended claims.

What is claimed is:

1. A method for regulating communication with a server, comprising:
  determining a retransmission rate of data packets during a first set of conversations between a group of users and the server via a peering link in a network, wherein a given conversation in the first set of conversations was initiated within a first time interval;
  comparing the retransmission rate and an historical retransmission rate of data packets during a second set of conversations between a second group of users and the server via the peering link, wherein a given conversation in the second set of conversations occurred within a second time interval, and wherein the second set of conversations includes the first set of conversations, the second group of users includes the first group of users, and the second time interval includes the first time interval;
  adjusting a target acceptance rate of the server to requests to initiate conversations with additional users via the peering link based on the comparison of the retransmission rate and the historical retransmission rate; and
  accepting or rejecting a request to initiate a conversation between another user and the server via the peering link based on an actual acceptance rate of the server to requests to initiate the conversations with the additional users via the peering link and the target acceptance rate, thereby maintaining communication performance of the peering link.

2. The method of claim 1, wherein the network includes the Internet.

3. The method of claim 1, wherein the first time interval includes one minute.

4. The method of claim 1, wherein the second time interval includes one day.

5. The method of claim 1, wherein the historical retransmission rate includes a moment of a distribution of the retransmission rate during the second time interval.

6. The method of claim 5, wherein the moment includes the median.

7. The method of claim 1, wherein the network includes at least one transit link coupled to another server; and
  wherein the at least one transit link couples the server to an Internet Service Provider.

8. The method of claim 7, wherein a rejection of the request includes instructions redirecting the other user to the other server.

9. The method of claim 1, wherein accepting or rejecting the request is based on a difference between the actual acceptance rate and the target acceptance rate.

10. The method of claim 1, wherein a peering link includes a settlement-free link between the server and another entity on the network.

11. The method of claim 1, further comprising collecting statistical information about the second set of conversations, wherein the retransmission rate is determined, at least in part, based on the collected statistical information.

12. The method of claim 1, further comprising determining which conversations are likely to be associated with the peering link based on Border Gateway Protocol information.

13. The method of claim 1, wherein the target acceptance rate of the server is greater than a minimum value and less than a maximum value.

14. The method of claim 1, wherein the target acceptance rate of the server is less than twice the actual acceptance rate of the server.

15. The method of claim 1, wherein the target acceptance rate is adjusted based on a van Jacobsen control model.

16. The method of claim 1, wherein the target acceptance rate is adjusted based on a difference between the retransmission rate and the historical retransmission rate.

17. The method of claim 1, wherein the target acceptance rate is adjusted when the retransmission rate exceeds the historical retransmission rate by a pre-determined value.

18. The method of claim 17, wherein the adjustment includes reducing the target acceptance rate by a multiplicative factor.

19. The method of claim 18, further comprising increasing the target acceptance rate by an additive increment when a conversation terminates, wherein the additive increment is selected so that an associated rate of increase in the target acceptance rate is less than a rate of decrease in the target acceptance rate associated with the multiplicative factor.

20. The method of claim 17, further comprising increasing the target acceptance rate when a conversation terminates.

21. A computer program product for use in conjunction with a computer system, the computer program product comprising a non-transitory computer-readable storage medium and a computer-program mechanism embedded therein for configuring the computer system, the computer-program mechanism including:
  instructions for determining a retransmission rate of data packets during a first set of conversations between a group of users and the server via a peering link in a network, wherein a given conversation in the first set of conversations was initiated within a first time interval;
  instructions for comparing the retransmission rate and an historical retransmission rate of data packets during a second set of conversations between a second group of users and the server via the peering link, wherein a given conversation in the second set of conversations occurred within a second time interval, and wherein the second set of conversations includes the first set of conversations, the second group of users includes the first group of users, and the second time interval includes the first time interval;
  instructions for adjusting a target acceptance rate of the server to requests to initiate conversations with additional users via the peering link based on the comparison of the retransmission rate and the historical retransmission rate; and
  instructions for accepting or rejecting a request to initiate a conversation between another user and the server via the peering link based on an actual acceptance rate of the server to requests to initiate the conversations with the additional users via the peering link and the target acceptance rate, thereby maintaining communication performance of the peering link.

22. A computer system, comprising:
  means for computing;
  memory;
  a program module, wherein the program module is stored in the memory and configured to be executed by the means, the program module including:
    instructions for determining a retransmission rate of data packets during a first set of conversations between a group of users and the server via a peering link in a network, wherein a given conversation in the first set of conversations was initiated within a first time interval;
    instructions for comparing the retransmission rate and an historical retransmission rate of data packets during a second set of conversations between a second group of users and the server via the peering link, wherein a given conversation in the second set of conversations occurred within a second time interval, and wherein the second set of conversations includes the first set of conversations, the second group of users includes the first group of users, and the second time interval includes the first time interval;

instructions for adjusting a target acceptance rate of the server to requests to initiate conversations with additional users via the peering link based on the comparison of the retransmission rate and the historical retransmission rate; and instructions for accepting or rejecting a request to initiate a conversation between another user and the server via the peering link based on an actual acceptance rate of the server to requests to initiate the conversations with the additional users via the peering link and the target acceptance rate, thereby maintaining communication performance of the peering link.

23. A computer system, comprising:

a processor;

memory;

a program module, wherein the program module is stored in the memory and configured to be executed by the processor, the program module including:

instructions for determining a retransmission rate of data packets during a first set of conversations between a group of users and the server via a peering link in a network, wherein a given conversation in the first set of conversations was initiated within a first time interval;

instructions for comparing the retransmission rate and an historical retransmission rate of data packets during a second set of conversations between a second group of users and the server via the peering link, wherein a given conversation in the second set of conversations occurred within a second time interval, and wherein the second set of conversations includes the first set of conversations, the second group of users includes the first group of users, and the second time interval includes the first time interval;

instructions for adjusting a target acceptance rate of the server to requests to initiate conversations with additional users via the peering link based on the comparison of the retransmission rate and the historical retransmission rate; and instructions for accepting or rejecting a request to initiate a conversation between another user and the server via the peering link based on an actual acceptance rate of the server to requests to initiate the conversations with the additional users via the peering link and the target acceptance rate, thereby maintaining communication performance of the peering link.

24. A server, comprising:

an input node configured to couple to a network that includes a peering link which is configured to communicate data packets between users and the server; and a peering manager configured to:

determine a retransmission rate of data packets during a first set of conversations between a group of users and the server via the peering link, wherein a given conversation in the first set of conversations is to be initiated within a time interval;

compare the retransmission rate and an historical retransmission rate of data packets during a second set of conversations between a second group of users and the server via the peering link, wherein a given conversation in the second set of conversations is to occur within another time interval, and wherein the second set of conversations includes the first set of conversations, the second group of users includes the first group of users, and the other time interval includes the time interval;

adjust a target acceptance rate of the server to requests to initiate conversations with additional users via the peering link based on the comparison of the retransmission rate and the historical retransmission rate; and accept or reject a request to initiate a conversation between another user and the server via the peering link based on an actual acceptance rate of the server to requests to initiate the conversations with the additional users via the peering link and the target acceptance rate, thereby maintaining communication performance of the peering link.

* * * * *